United States Patent [19]
Patel

[11] Patent Number: 5,383,544
[45] Date of Patent: Jan. 24, 1995

[54] FORCE TRANSMITTING ASSEMBLY
[75] Inventor: Kirit R. Patel, North Royalton, Ohio
[73] Assignee: Eaton Corporation, Cleveland, Ohio
[21] Appl. No.: 134,971
[22] Filed: Oct. 12, 1993
[51] Int. Cl.6 ............................................. F16D 13/69
[52] U.S. Cl. ............................ 192/70.28; 192/70.26; 192/111 B
[58] Field of Search ............... 192/70.28, 70.25, 70.26, 192/111 B

[56] References Cited
U.S. PATENT DOCUMENTS

| | | | |
|---|---|---|---|
| 2,345,244 | 3/1944 | Eason | 192/70.28 X |
| 2,523,501 | 9/1950 | Davies et al. | 192/70.28 |
| 3,537,556 | 11/1970 | Pfeffer et al. | 192/70.28 |
| 3,747,729 | 7/1973 | Storer, Jr. | 192/70.28 |
| 4,368,810 | 1/1983 | Maucher et al. | 192/70.28 |
| 4,802,564 | 2/1989 | Stodt | 192/70.28 |
| 5,080,212 | 1/1992 | Flotow et al. | 192/70.25 |

FOREIGN PATENT DOCUMENTS

| | | | |
|---|---|---|---|
| 703698 | 12/1979 | U.S.S.R. | 192/70.28 |
| 1278519 | 12/1986 | U.S.S.R. | 192/70.28 |

OTHER PUBLICATIONS

Publication entitled Installation and Adjustment of the Disc Centering Option used in Airflex 229 DBA Brake Assemblies, publication date Oct. 1991.

*Primary Examiner*—Andrea L. Pitts
*Attorney, Agent, or Firm*—Tarolli, Sundheim & Covell

[57]  ABSTRACT

An improved force transmitting assembly includes a pair of force transmitting discs and a reaction disc which is disposed between the force transmitting discs. When the force transmitting assembly is in a disengaged condition, a spacer assembly maintains the force transmitting discs spaced apart by a distance which is greater than the distance between opposite side surfaces of the reaction disc. A locator assembly moves the force transmitting discs to predetermined positions whenever the force transmitting assembly is operated from the engaged condition to the disengaged condition. As the force transmitting assembly is disengaged, the locator assembly pulls one force transmitting disc to a predetermined position. Since the spacer assembly maintains a predetermined space between the two force transmitting discs, the other force transmitting disc is also moved to a predetermined position as the locator assembly pulls the one force transmitting disc to a predetermined position.

5 Claims, 5 Drawing Sheets

FORCE TRANSMITTING ASSEMBLY

BACKGROUND OF THE INVENTION

The present invention relates to a new and improved force transmitting assembly which is operable between an engaged condition in which the force transmitting assembly is effective to transmit force and a disengaged condition in which the force transmitting assembly is ineffective to transmit force. The force transmitting assembly may be used as either a clutch or brake.

A known force transmitting assembly includes a pair of force transmitting discs and a reaction disc which is disposed between the force transmitting discs. When the force transmitting assembly is in the disengaged condition, the reaction springs on both sides of the reaction disc tend to center it between the two force transmitting discs.

The two springs tend to maintain the force transmitting discs and the reaction disc in a spaced apart relationship when the known force transmitting assembly is in a disengaged condition. However, if the springs do not have equal strength and/or the two force transmitting discs encounter different frictional resistance to movement under the influence of the springs, the force transmitting discs may not always be moved to the desired positions relative to the reaction disc. If the force transmitting discs are not moved to the desired positions relative to the reaction disc, one or more friction surfaces in the force transmitting assembly could drag when the force transmitting assembly is in the disengaged condition.

SUMMARY OF THE INVENTION

An improved force transmitting assembly is operable between an engaged condition in which the force transmitting assembly is effective to transmit force and a disengaged condition in which the force transmitting assembly is ineffective to transmit force. The force transmitting assembly includes a pair of force transmitting discs. A reaction disc is disposed between the force transmitting discs. A spacer assembly is provided to maintain the force transmitting discs spaced apart by a distance which is greater than the distance between opposite side surfaces on the reaction disc when the force transmitting assembly is in the disengaged condition.

The spacer assembly includes a reference surface which is connected with a first one of the force transmitting discs for movement therewith during operation of the force transmitting assembly between the engaged and disengaged conditions. A second reference surface is connected with the second force transmitting disc for movement therewith during operation of the force transmitting assembly between the engaged and disengaged conditions. The first and second reference surfaces are spaced apart when the force transmitting assembly is in the engaged condition. The first and second reference surfaces are disposed in engagement when the force transmitting assembly is in the disengaged condition.

A locator assembly is advantageously utilized to apply force to one of the force transmitting discs to move the one force transmitting disc to a predetermined position upon operation of the force transmitting assembly from the engaged condition to the disengaged condition. A force transmitting system is used to transmit force applied to the one force transmitting disc by the locator assembly to move the other force transmitting disc to a predetermined position. The force transmitting system may be the spacer assembly.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

A force transmitting assembly 10 (FIGS. 1 and 2) may be used as either a clutch or a brake. The force transmitting assembly 10 is operable between a disengaged condition in which the force transmitting assembly is ineffective to transmit force and an engaged condition (FIGS. 3 and 4) in which the force transmitting assembly is effective to transmit force. When the force transmitting assembly 10 is in the disengaged condition (FIGS. 1 and 2), the force transmitting assembly is ineffective to transmit force between a rotatable shaft 12 and a mounting flange or base member 14.

Figure 3:
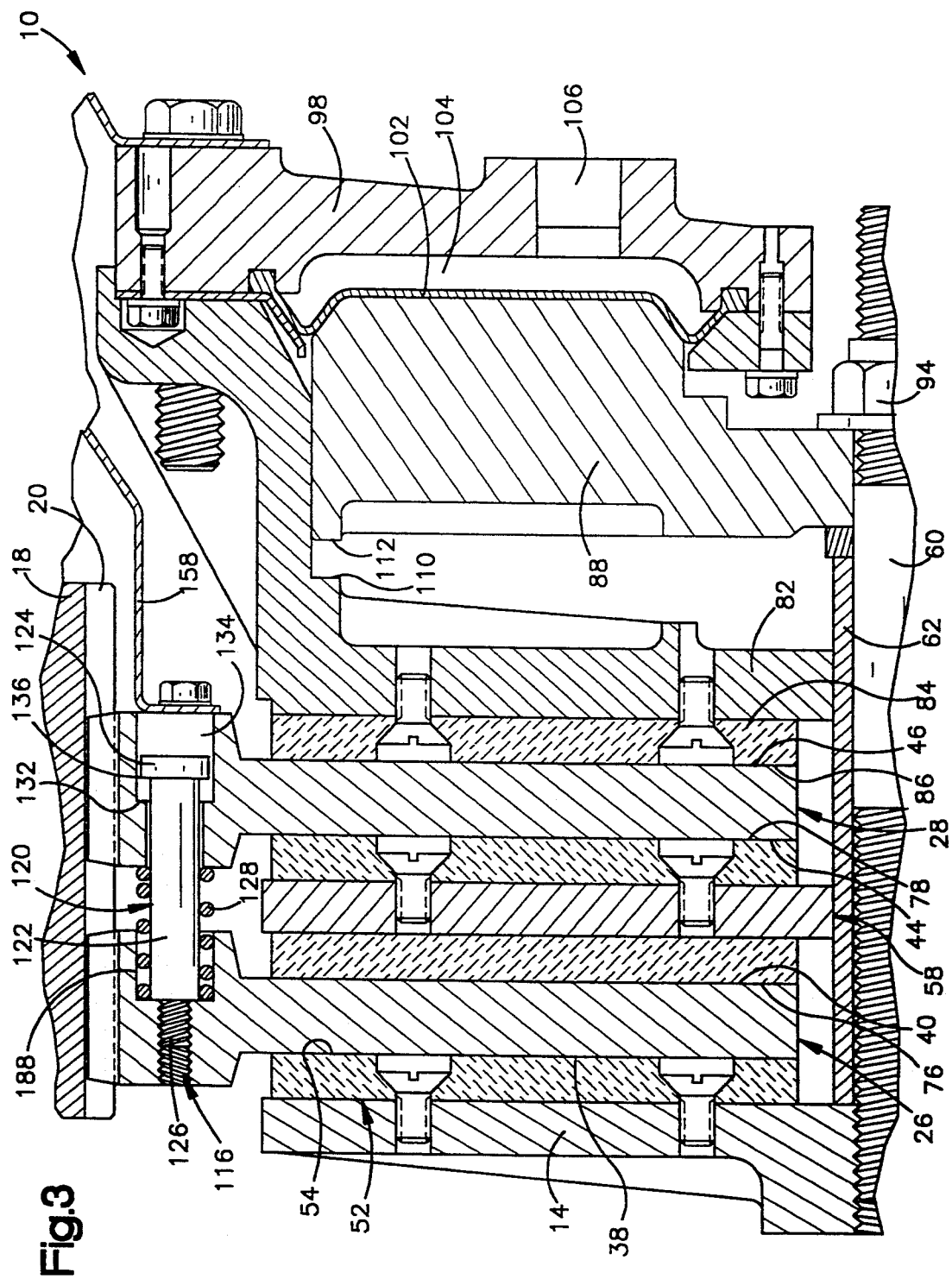
FIG. 3 is an enlarged fragmentary sectional view of a portion of the force transmitting assembly of FIG. 1 illustrating the relationship between the spacer assembly and the force transmitting discs when the force transmitting assembly is in the engaged condition.

When the force transmitting assembly 10 is used as a clutch, the mounting flange or base member 14 is fixedly secured to a member (not shown) to be driven by the rotatable shaft 12. When the force transmitting assembly 10 is to be used .as a brake, the mounting flange or base member 14 may be fixedly secured to a stationary member. When the force transmitting assembly 10 is in the engaged condition (FIGS. 3 and 4), the force transmitting assembly 10 is effective to transmit force from the rotatable shaft 12 (FIG. 4) to the member connected with the mounting flange or base member 14 (FIG. 3).

The force transmitting assembly 10 (FIG. 1) includes a circular hub or inner member 18 having an array of external splines or teeth 20. The hub 18 has an axially tapered central opening 22. A tapered end portion of the rotatable shaft 12 is received in the tapered opening 22 in the hub 18. The hub 18 is keyed to the shaft 12 to prevent relative rotation between the hub and the shaft.

A pair of annular force transmitting discs 26 and 28 (FIG. 1) are connected to the hub 18. The force transmitting discs 26 and 28 have internal splines 32 and 34 which slidably engage the splines 20 on the outside of the hub 18. The force transmitting disc splines 32 and 34 enable the force transmitting discs 26 and 28 to be readily moved axially along the hub 18 between the disengaged positions shown in FIG. 1 and the engaged positions shown in FIG. 3. Although only two force transmitting discs 26 and 28 have been shown, additional force transmitting discs could be provided if desired.

Figure 1:
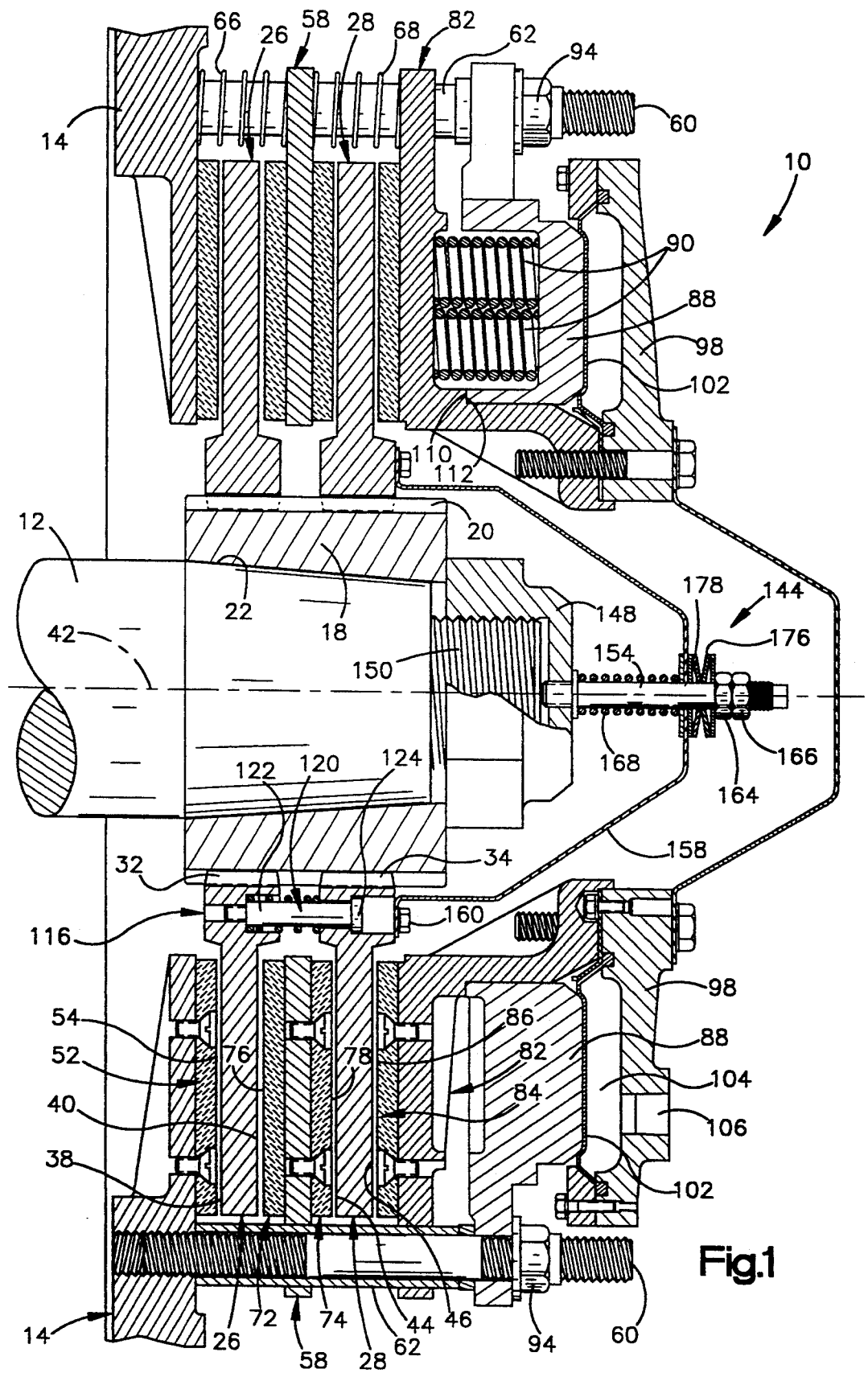
FIG. 1 is a sectional view illustrating the construction of a force transmitting assembly constructed in accordance with the present invention, the force transmitting assembly being shown in a disengaged condition.
Figure 2:
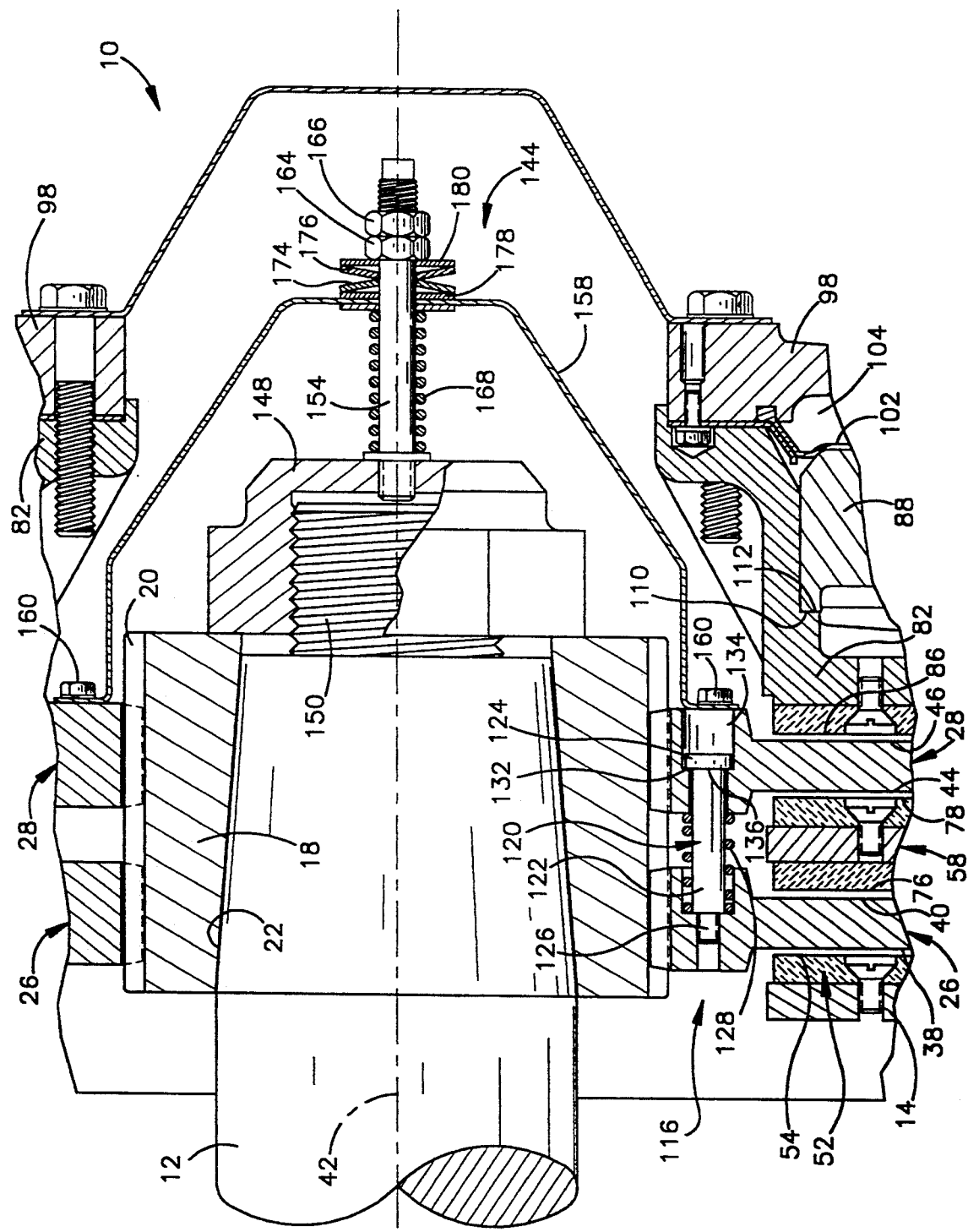
FIG. 2 an enlarged fragmentary sectional view of a portion of FIG. 1 and illustrating the manner in which a spacer assembly maintains a desired spacing between a pair of force transmitting discs and the manner in which a locator assembly moves the force transmitting discs to predetermined positions.

The force transmitting disc 26 has parallel flat annular side surfaces 38 and 40 (FIGS. 1 and 2). The flat side surfaces 38 and 40 are disposed in radial planes which extend perpendicular to a central axis 42 of the motor output shaft 12 and hub 18. Similarly, the force transmitting disc 28 has parallel flat annular side surfaces 44 and 46. The flat side surfaces 44 and 46 are disposed in radial planes which extend perpendicular to the central axis 42 of the hub 18 and motor output shaft 12. The force transmitting discs 26 and 28 have central axes which are coincident with the axis 42 of the hub 18 and motor output shaft 12.

An annular friction lining 52 is fixedly secured to the mounting flange or base member 14 and has a flat annular friction surface 54. The flat annular friction surface 54 faces toward and is engageable by the flat annular side surface 38 on the force transmitting disc 26. The friction surface 54 is disposed in a plane which extends perpendicular to the axis 42.

An annular reaction disc 58 is disposed between the force transmitting discs 26 and 28. The reaction disc 58 is disposed in a coaxial relationship with the force transmitting discs 26 and 28 and motor output shaft 12. Of course, if additional force transmitting discs were provided, additional reaction discs would also be provided. For example, if three force transmitting discs, corresponding to the discs 26 and 28, were used, a second reaction disc, having the same construction as the reaction disc 58, would be provided.

The reaction disc 58 is held against rotation relative to the base or mounting flange 14 by a plurality of studs 60 (FIG. 1). In the illustrated embodiment of the invention there are twelve studs 60 disposed in an annular array on the base 14. The studs 60 are enclosed by cylindrical clamp tubes 62 (FIG. 1).

The clamp tubes 62 extend through circular openings formed in the reaction disc 58. The clamp tubes 62 and studs 60 have coincident central axes which extend parallel to the axis 42. The reaction disc 58 is freely slidable axially along the clamp tubes 62. However, the clamp tubes 62 and studs 60 hold the reaction disc 58 against rotation relative to the mounting flange or base 14.

In accordance with one of the features of the invention, when the force transmitting assembly 10 is in the disengaged condition of FIG. 1, reaction springs 66 and 68 urge the reaction disc 58 to a predetermined position relative to the clamp tubes 62 and the base 14. The helical reaction springs 66 and 68 extend around and are axially movable relative to the clamp tubes 62. Although only one pair of reaction springs 66 and 68 is shown in FIG. 1, it should be understood that six sets of reaction springs are mounted on six equally spaced apart clamp tubes 62 and studs 60.

Annular friction linings 72 and 74 are fixedly secured to the reaction disc 58 and have flat annular friction surfaces 76 and 78. The friction surfaces 76 and 78 are disposed in planes which extend perpendicular to the axis 42. The flat annular friction surface 76 faces toward and is engageable by the flat annular side surface 40 on the force transmitting disc 26. Similarly, the flat annular friction surface 78 faces toward and is engageable by the flat annular side surface 44 on the force transmitting disc 28.

An annular pressure plate 82 (FIG. 1) has openings through which the clamp tubes 62 and studs 60 extend. The pressure plate 82 has a central axis which is coincident with the axis 42. The pressure plate 82 is held against rotation by and is freely movable axially relative to the clamp tubes 62 and studs 60. An annular friction lining 84 is fixedly secured to the pressure plate 82 and has a flat annular friction surface 86. The friction surface 86 extends perpendicular to the axis 42. The flat annular friction surface 86 faces toward and is engageable with the flat annular side surface 46 on the force transmitting disc 28.

An annular spring housing 88 encloses a plurality of sets of helical coil springs 90 (FIG. 1). The spring housing 88 is coaxial with the pressure plate 82 and reaction disc 58. The spring housing 88 has a plurality of openings through which the studs 60 extend. The clamp tubes 62 cooperate with clamp nuts 94 to hold the spring housing 88 against axial and rotational movement relative to the mounting flange 14. Thus, the mounting flange 14 and spring housing 88 are fixedly interconnected and cannot move relative to each other during operation of the force transmitting assembly 10.

The helical coil springs 90 are disposed between the stationary spring housing 88 and the axially movable pressure plate 82. The springs 90 urge the pressure plate 82 toward the mounting flange 14 to clamp the force transmitting discs 26 and 28 between the mounting flange 14, reaction disc 58 and pressure plate 82 when the force transmitting assembly 10 is in the engaged condition of FIG. 3.

An annular end plate 98 (FIG. 1) is fixedly connected with the pressure plate 82. The end plate 98 is coaxial with the spring housing 88 and reaction disc 58. The end plate 98 moves axially relative to the studs 60 and clamp tubes 62 with the pressure plate 82. An annular flexible diaphragm 102 cooperates with the end plate 98 to form an annular pressure chamber 104 between the axially movable end plate 98 and the stationary spring housing 88.

When the force transmitting assembly 10 is to be operated to the disengaged condition of FIG. 1, high pressure fluid (air) is conducted into the pressure chamber 104 through a plurality of passages 106. The high pressure fluid in the pressure chamber 104 urges the end plate 98 toward the right (as viewed in FIG. 1). The high pressure fluid (air) in the pressure chamber 104 moves the end plate 98 toward the right until an annular shoulder 110 (FIGS. 1 and 2) on the pressure plate 82 moves into abutting engagement with an annular side surface 112 on the spring housing 88.

When the force transmitting assembly 10 is to be operated from the disengaged condition of FIG. 1 to the engaged condition of FIG. 3, the high pressure fluid (air) is conducted from the chamber 104 through the passages 106. Contemporaneously with the flow of fluid from the chamber 104, the springs 90 (FIG. 1) move the pressure plate 82 toward the left (as viewed in FIG. 1). As this occurs, the shoulder 110 on the pressure plate 82 moves away from the annular end surface 112 on the spring housing 88.

When the force transmitting assembly 10 is operated from the engaged condition of FIG. 3 back to the disengaged condition of FIG. 1 by fluid pressure in the chamber 104, the shoulder surface 110 on the pressure plate 82 moves back into abutting engagement with the end surface 112 on the spring housing 88. This results in the pressure plate 82 being accurately positioned relative to the mounting flange 14 when the force transmitting assembly 10 is in the disengaged condition of FIG. 1.

Spacer Assembly

In accordance with another of the features of the present invention, a spacer assembly 116 (FIGS. 1 and 2) is provided to maintain the force transmitting discs 26 and 28 spaced apart by a distance which is greater than the distance between the friction surfaces 76 and 78 on the reaction disc 58 when the force transmitting assembly 10 is in the disengaged condition. The spacer assembly 116 includes a rigid spacer shaft or shoulder screw 120 (FIG. 2). The spacer shaft 120 has a central axis which extends parallel to the axis 42. Although only a single spacer assembly 116 has been shown in FIGS. 1 and 2, it should be understood that there are three spacer assemblies disposed at equally spaced intervals about the central axis 42 of the force transmitting discs 26 and 28.

The spacer shaft 120 includes a cylindrical shank portion 122 and a cylindrical head end portion 124. An externally threaded mounting section 126 at one end of the shank portion 122 is secured to the force transmitting disc 26. A helical coil spring 128 extends around the spacer shaft 120 and presses against the force transmitting discs 26 and 28. If desired, wear spacers (not shown) may be provided between the left (as viewed in FIG. 2) end of the shank portion 122 and the force transmitting disc 26.

An annular reference surface or shoulder 132 (FIG. 3) is formed in a cylindrical recess 134 in the force transmitting disc 28. A second annular reference surface 136 is formed on the head end portion 124 of the spacer shaft 122. The reference surface 132 moves with the force transmitting disc 28. The reference surface 136 moves with the force transmitting disc 26. The reference surfaces 132 and 136 are disposed in flat planes which extend perpendicular to the axis 42.

When the force transmitting assembly 10 is in the engaged condition of FIG. 3, the reference surfaces 132 and 136 are spaced apart from each other. At this time, the side surfaces 40 and 44 on the force transmitting discs 26 and 28 are pressed against the friction surfaces 76 and 78 on the reaction disc 58 by the springs 90 (FIG. 1). Engagement of the friction surfaces 76 and 78 on the reaction disc 58 (FIG. 3) with the force transmitting disc surfaces 40 and 44 transmits force between the shaft 12 and the member connected with the mounting flange 14.

When the force transmitting assembly 10 is in the disengaged condition of FIG. 2, the reference surface 132 on the force transmitting disc 28 and the reference surface 136 on the head end portion 124 of the spacer shaft 120 are disposed in abutting engagement. The side surfaces 40 and 44 on the force transmitting discs 26 and 28 are spaced apart by a distance which is determined by the axial extent of the shank portion 122 of the spacer shaft 120. The distance between the side surfaces 40 and 44 on the force transmitting discs 26 and 28 is greater than the distance between the friction surfaces 76 and 78 on the reaction disc 58.

When the reference surfaces 132 and 136 are disposed in abutting engagement, the side surfaces 40 and 44 on the force transmitting discs 26 and 28 can be located so as to eliminate any possibility of dragging and excessive wear of the force transmitting assembly 10. This is because the spacer assembly 116 maintains a predetermined distance between the surfaces 40 and 44 on the force transmitting discs 26 and 28 when the force transmitting assembly 10 is disengaged. When the force transmitting assembly 10 is disengaged, the biasing spring 128 maintains the reference surfaces 132 and 136 in abutting engagement when the force transmitting assembly 10 is in the disengaged condition of FIG. 2. If more than two force transmitting discs 26 and 28 are to be used, additional spacer assemblies 116 would be provided. Thus, if there were three force transmitting discs, spacer assemblies would be provided between the center force transmitting disc and each of the outer force transmitting discs.

Locator Assembly

In accordance with another feature of the present invention, a locator assembly 144 (FIGS. 2 and 4) is provided to position the force transmitting discs 26 and 28 relative to the hub or inner member 18 and the reaction disc 58 when the force transmitting assembly is disengaged. When the force transmitting assembly 10 is in the disengaged condition of FIG. 2, the locator assembly 144 accurately positions the force transmitting disc 28 relative to the hub 18 and reaction disc 58. Since the spacer assembly 116 accurately positions the force transmitting disc 26 relative to the force transmitting disc 28, the locator assembly 144 cooperates with the spacer assembly 116 to accurately position both of the force transmitting discs 26 and 28 relative to the hub 18 and reaction disc 58. The reaction disc 58 is accurately positioned relative to the mounting flange 14 and pressure plate 82 by the reaction springs 66 and 68 (FIG. 1).

The locator assembly 144 is connected with the motor output shaft 12. In the illustrated embodiment of the invention, the locator assembly 144 is connected to an internally threaded shaft nut 148. The shaft nut 148 is disposed in engagement with an external thread convolution 150 on the end of the rotatable shaft 12. The shaft nut 148 presses the internally tapered hub 18 onto the externally tapered end portion of the motor output shaft. A lock washer (not shown) may be provided between the shaft nut 148 and the hub 18 if desired.

A generally cylindrical locator shaft 154 (FIGS. 1 and 2) extends axially outward from the motor shaft nut 148. The locator shaft 154 has a longitudinal central axis which is coincident with the longitudinal central axis 42 of the force transmitting assembly 10. A locator cone or force transmitting member 158 is slidably mounted on the locator shaft 154. The locator cone 158 is fixedly secured to the force transmitting disc 28 by fasteners 160. Therefore, when the locator cone 158 is moved axially along the shaft 154, the force transmitting disc 28 is moved axially relative to the hub or inner member 18.

A pair of nuts 164 and 166 are connected with a threaded end portion of the locator shaft 154. A helical coil spring 168 urges the locator cone 158 axially outward toward the nuts 164 and 166. The locator cone 158 is accurately positioned relative to the locator shaft 154, when the force transmitting assembly 10 is disengaged, by the spring 168 and nuts 164 and 166. This enables the locator cone 158 to accurately position the force transmitting disc 28 in a predetermined location relative to the hub 18 and the reaction disc 58 when the force transmitting assembly 10 is in the disengaged condition of FIG. 2.

A pair of spring discs or "Belleville" (trademark) washers 174 and 176 are provided between flat washers 178 and 180 on the locator shaft 154. The "Belleville" springs 174 and 176 absorb any axial vibrations of the motor output shaft 12 with minimal movement of the locator cone 158 and force transmitting disc 28.

Although it is preferred to mount the locator assembly 144 on the shaft nut 148, the locator assembly 144 could be mounted directly on the shaft 12 if desired. Thus, an internally threaded opening in the shaft 12 could be engaged by the locator shaft. Although a generally conical locator cone 158 is used to transmit force from the spring 168 to the force transmitting disc 28, a plurality of straps could be used to transmit the force if desired.

Force transmitting Disc

Figure 5:
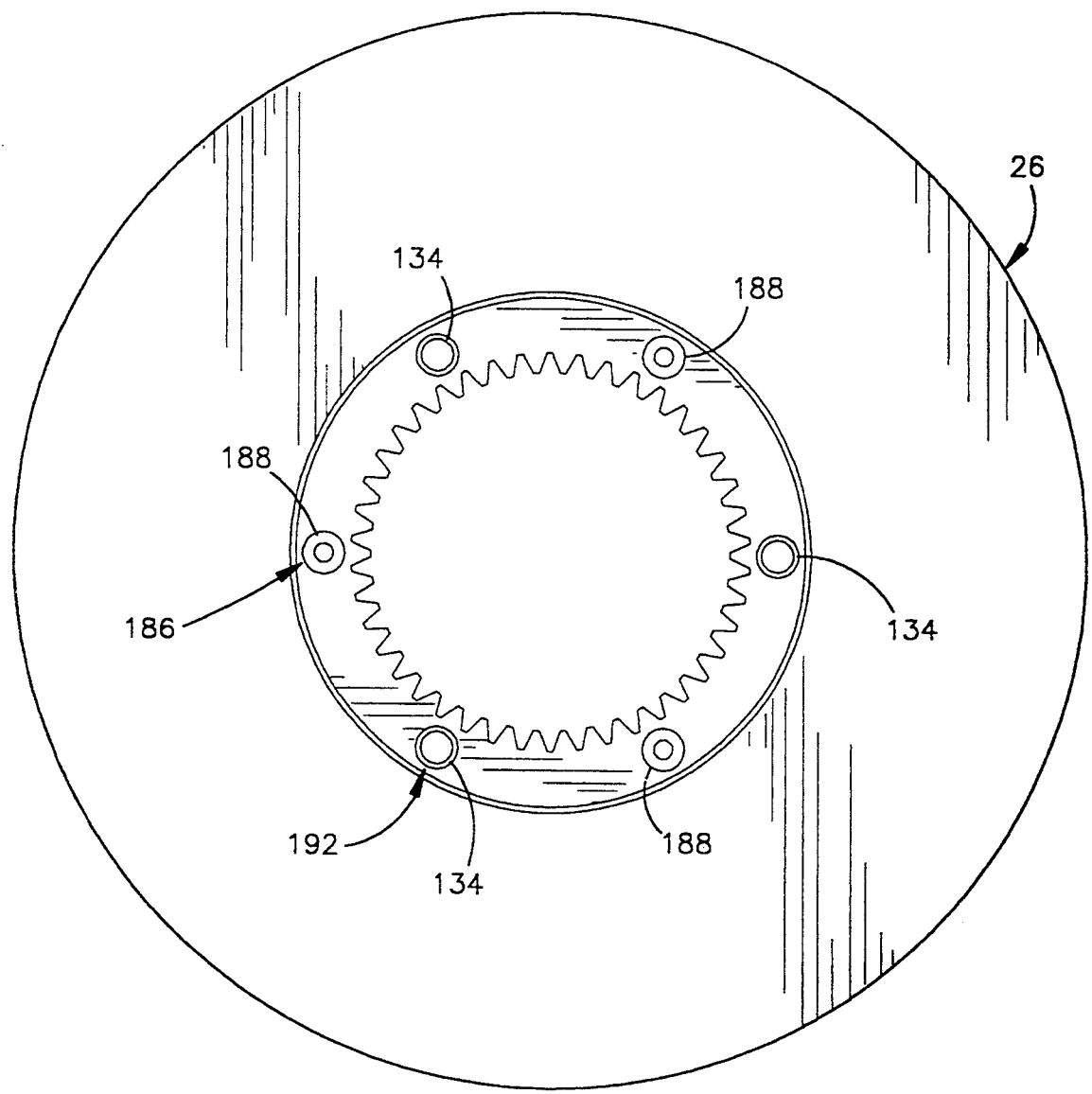
FIG. 5 is a plan view, on a reduced scale, of one of the force transmitting discs in the force transmitting assembly of FIG. 1.

In order to simplify construction of the force transmitting assembly 10 and to minimize spare part inventory requirements, the force transmitting discs 26 and 28 are identical in construction. Thus, the force transmitting disc 26 (FIG. 5) is provided with a first set or series 186 of openings 188 which are internally threaded to receive the threaded end portion 126 of the spacer shaft shank 122 (FIG. 3). In addition, the force transmitting disc 26 is provided with a second set or series 192 of recesses 134 which receive the head end portion 124 of the spacer shaft 120.

Figure 4:
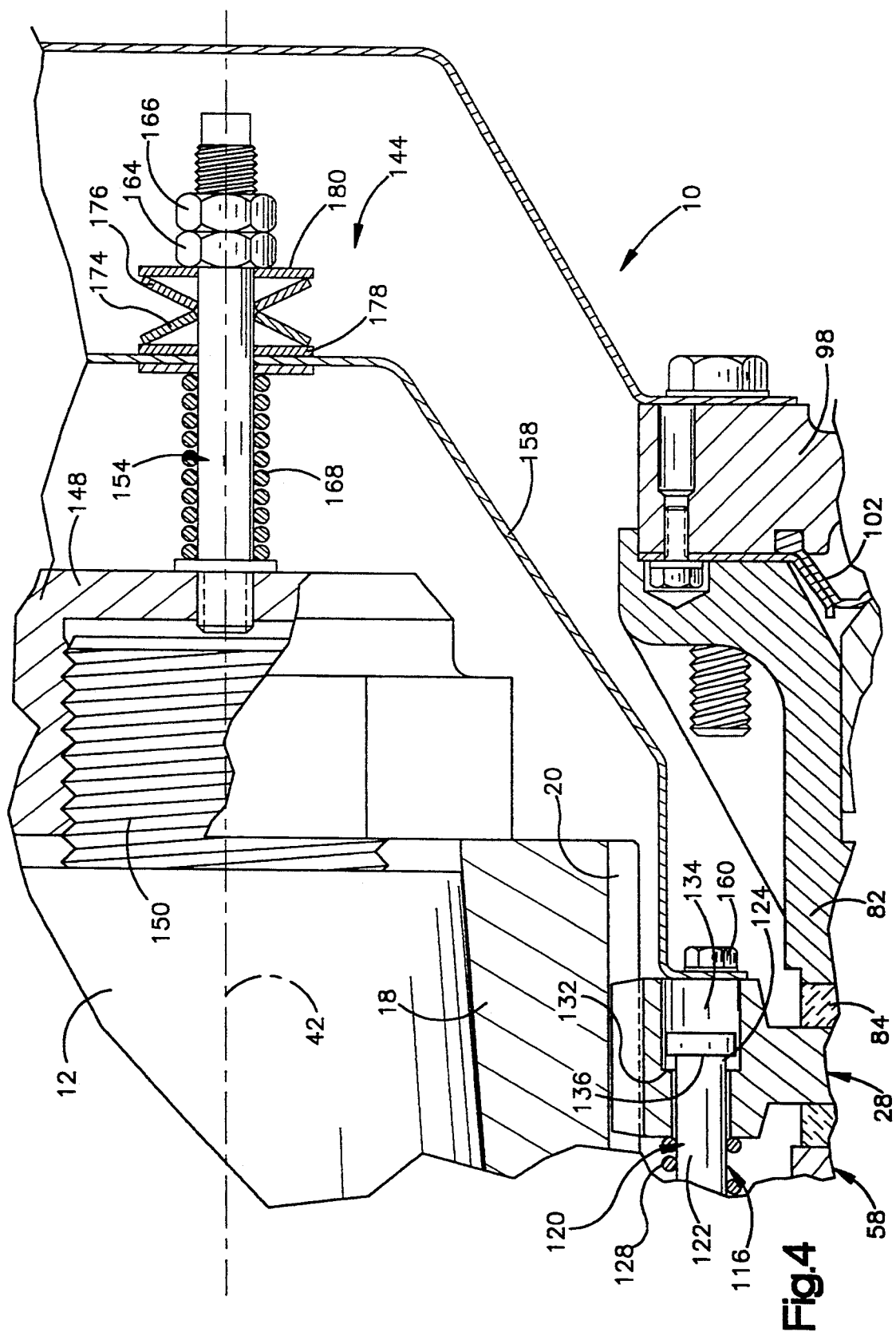
FIG. 4 is an enlarged fragmentary sectional view of a portion of the force transmitting assembly of FIG. 1 and illustrating the relationship between the locator assembly, a force transmitting disc and the spacer assembly when the force transmitting-assembly is in the engaged condition.

By providing the force transmitting disc 26 with the two series 186 and 192 of openings, the force transmitting disc 26 can be utilized as either the left force transmitting disc or the right force transmitting disc (as viewed in FIGS. 1 and 3) in the force transmitting assembly 10. It should be noted that in addition to the two series 186 and 192 of openings, the force transmitting disc 26 is provided with threaded openings to receive the fasteners 160 which secure the locator cone 158 to the force transmitting disc 28 (FIG. 4).

Operation

When the force transmitting assembly 10 is in the disengaged condition of FIGS. 1 and 2, the reaction disc 58 is accurately positioned relative to the mounting flange 14 and pressure plate 82 by the reaction springs 66 and 68 (FIG. 1). The locator assembly 144 accurately positions the force transmitting disc 28 relative to the hub 18 and the reaction disc 58. At this time, the locator assembly 144 retains the force transmitting disc 28 in a position in which the force transmitting disc is midway between the friction surface 78 on the reaction disc 58 and the friction surface 86 on the pressure plate 82. Therefore, the side surfaces 44 and 46 on the force transmitting disc 28 cannot drag on the friction surfaces 78 and 86. This tends to minimize wear of the force transmitting assembly 10.

When the force transmitting assembly 10 is in the disengaged condition of FIG. 1, the spacer assembly 116 accurately positions the force transmitting disc 26 relative to the force transmitting disc 28. Thus, the spacer assembly 116 maintains a predetermined space between the force transmitting discs 26 and 28. Since the force transmitting disc 28 is accurately positioned by the locator assembly 144, the spacer assembly 116 is effective to accurately position the force transmitting disc 26 relative to the hub 18 and reaction disc 58.

When the force transmitting assembly 10 is in the disengaged condition (FIGS. 1 and 2), the force transmitting disc 26 is positioned midway between the friction surface 54 on the mounting flange or base 14 and the friction surface 76 on the reaction disc 58. Therefore, the side surfaces 38 and 40 on the force transmitting disc 26 cannot engage the friction surfaces 54 and 76 when the force transmitting assembly 10 is in the disengaged condition. This tends to minimizes wear of the force transmitting assembly 10.

When the force transmitting assembly 10 is to be operated to the engaged condition, fluid pressure in the chamber 104 is vented through the passages 106. This enables the springs 90 to move the pressure plate 82 toward the left (as viewed in FIG. 1). Leftward movement of the pressure plate 82 results in the force transmitting disc 28, reaction disc 58 and force transmitting disc 26 being moved leftward toward the mounting flange 14. Engagement between the friction surfaces on the various components of the force transmitting assembly 10 is then effective to transmit force between the rotatable shaft 12 and the base or mounting flange 14. This force is transmitted through the force transmitting discs 26 and 28, reaction discs 58 and pressure plate 82. This enables the shaft 12 to either drive a member connected with the mounting flange 14 in a known manner or be held against rotation by the mounting flange.

As the force transmitting assembly 10 is operated to the engaged condition, the force transmitting disc 28 is pushed toward the left (as viewed in FIGS. 1 and 4) by the pressure plate 82. This leftward movement of the force transmitting disc 28 pulls the locator cone 158 toward the left against the influence of the biasing spring 168. As the locator cone 158 is moved leftward, the "Belleville" (trademark) springs 174 and 176 expand to take up the space between the flat washers 178 and 180 (FIG. 4).

During operation of the force transmitting assembly from the disengaged condition of FIGS. 1 and 2 to the engaged condition of FIGS. 3 and 4, the reference surfaces 132 and 136 in the spacer assembly 116 are separated. Thus, the reference surface 132 on the force transmitting disc 28 (FIG. 2) is moved axially away from the reference surface 136 on the head end portion 124 of the spacer shaft 120 (FIG. 3). As this occurs, the distance between the force transmitting discs 26 and 28 decreases and the spring 128 is compressed between the force transmitting discs. At this time, the spacer assembly 116 is ineffective to maintain a predetermined distance between the force transmitting discs 26 and 28. In addition, the locator assembly 144 is ineffective to position the force transmitting disc 28 in a predetermined location relative to the hub 18.

When the force transmitting assembly 10 is to be operated from the engaged condition of FIGS. 3 and 4 back to the disengaged condition of FIGS. 1 and 2, fluid pressure is conducted to the chamber 104. This fluid pressure causes the end plate 98 to move toward the right (as viewed in FIG. 1). Rightward movement of the end plate 98 pulls the pressure plate 82 toward the right away from the force transmitting disc 28.

As this occurs, the spring 168 in the locator assembly 144 moves the locator cone 158 toward the right (as viewed in FIG. 1). This rightward movement of the locator cone 158 pulls the force transmitting disc 28 toward the right until the locator cone 158 has moved to a predetermined position relative to the locator shaft 154. The flat washer 178 then blocks further rightward movement of the locator cone 158. At this time, the force transmitting disc 28 will be in a predetermined position relative to the hub 18.

As the locator assembly 144 is moving the force transmitting disc 28 toward a predetermined position relative to the hub 18, the reaction springs 66 and 68 (FIG. 1) are moving the reaction disc 58 to a predetermined position relative to the mounting flange 14 and pressure plate 82. Thus, as the force transmitting assembly 10 is operated from the engaged condition to the disengaged condition, the reaction springs 66 and 68 are effective to center the reaction disc 58 midway between the friction surface 54 connected with the mounting flange 14 and the friction surface 86 connected with the pressure plate 82.

In addition, as the locator assembly 144 is moving the force transmitting disc 28 toward a predetermined position relative to the hub 18, the biasing spring 128 in the spacer assembly 116 is effective to move the force transmitting disc 26 away from the force transmitting disc 28. Axial movement of the force transmitting disc 26 away from the force transmitting disc 28 is interrupted when the reference surface 136 on the head end portion 124 of the spacer shaft 120 engages the reference surface 132 on the force transmitting disc 28. When the reference surfaces 132 and 136 are in abutting engagement, there is a predetermined distance between the side surface 40 on the force transmitting disc 26 and the side surface 44 on the force transmitting disc 28.

After the spacer assembly 116 has established a predetermined distance between the force transmitting discs 26 and 28, the locator assembly 144 is effective to move the two force transmitting discs 26 and 28 together toward predetermined positions relative to the hub 18 and the reaction disc 58. Thus, force is transmitted through the locator cone 158 to pull the force transmitting disc 28 toward the right, in the manner previously explained, to a predetermined position relative to the hub 18. As this is occurring, engagement of the reference surfaces 132 and 136 results in the spacer shaft 120 pulling the force transmitting disc 26 toward the right (as viewed in FIG. 2) to a predetermined position relative to the hub 18.

This rightward movement (as viewed in FIGS. 2 and 3) of the force transmitting disc 26 moves the force transmitting disc to a predetermined position relative to both the hub 18 and reaction disc 58. Thus, the two force transmitting discs 26 and 28 are simultaneously moved to predetermined positions relative to the hub 18 and the reaction disc 58 by the locator assembly 144. The force for moving the force transmitting disc 26 to its predetermined position relative to the hub 18 and reaction disc 58 is transmitted from the force transmitting disc 28 through the spacer assembly 116 to the force transmitting disc 26.

When the force transmitting assembly 10 is in the disengaged condition of FIG. 2, the force transmitting discs 26 and 28 are both located in predetermined positions relative to the reaction disc 58, mounting flange 14 and pressure plate 82. This results in the side surfaces 38 and 40 on the force transmitting disc 26 being spaced from the friction surface 54 connected with the mounting flange 14. The side surface 40 of the force transmitting disc 26 is spaced from the friction surface 76 on the reaction disc 58. Similarly, the side surface 44 on the force transmitting disc 28 is spaced from the friction surface 78 on the reaction disc 58. The side surface 46 on the force transmitting disc 28 is also spaced from the friction surface 86 on the pressure plate 82. By having the side surfaces of the force transmitting discs 26 and 28 spaced from the friction surfaces connected with the mounting flange 14, reaction disc 58 and pressure plate 82, unnecessary wear of the disengaged force transmitting assembly 10 is avoided.

Conclusion

An improved force transmitting assembly 10 is operable between an engaged condition (FIGS. 3 and 4) in which the force transmitting assembly is effective to transmit force and a disengaged condition in which the force transmitting assembly is ineffective to transmit force. The force transmitting assembly 10 includes a pair of force transmitting discs 26 and 28. A reaction disc 58 is disposed between the force transmitting discs 26 and 28. A spacer assembly 16 is provided to maintain the force transmitting discs 26 and 28 spaced apart by a distance which is greater than the distance between opposite side surfaces 76 and 78 on the reaction disc 58 when the force transmitting assembly 10 is in the disengaged condition.

The spacer assembly 116 includes a reference surface 136 which is connected with a first one of the force transmitting discs 26 for movement therewith during operation of the force transmitting assembly between the engaged and disengaged conditions. A second reference surface 132 is connected with the second force transmitting disc 28 for movement therewith during operation of the force transmitting assembly between the engaged and disengaged conditions. The first and second reference surfaces 132 and 136 are spaced apart when the force transmitting assembly 10 is in the engaged condition (FIG. 3). The first and second reference surfaces 132 and 136 are disposed in engagement when the force transmitting assembly is in the disengaged condition (FIG. 2).

A locator assembly 144 is advantageously utilized to apply force to the force transmitting disc 28 to move the force transmitting disc 28 to a predetermined position upon operation of the force transmitting assembly from the engaged condition to the disengaged condition (FIG. 2). A force transmitting system is used to transmit force applied to the force transmitting disc 28 by the locator assembly 144 to move the other force transmitting disc 26 to a predetermined position. The force transmitting system may be the spacer assembly 116.

Having described the invention, the following is claimed:

1. A force transmitting assembly operable between an engaged condition in which said force transmitting assembly is effective to transmit force and a disengaged condition in which said force transmitting assembly is ineffective to transmit force, said force transmitting assembly comprising a first member, a first force transmitting disc connected with and movable relative to said first member, a second force transmitting disc connected with and movable relative to said first member, a second member, a reaction disc connected with and movable relative to said second member and disposed between said first and second force transmitting discs, said first and second force transmitting discs having side surfaces which are disposed in engagement with opposite site surfaces of said reaction disc when said force transmitting assembly is in the engaged condition, said first force transmitting disc being in a first predetermined position relative to said first member when said force transmitting assembly is in the disengaged condition, said first force transmitting disc being offset from said first predetermined position when said force transmitting assembly is in the engaged condition, said second force transmitting disc being in a second predetermined position relative to said first member when said force transmitting assembly is in the disengaged condition, said second force transmitting disc being offset from said second predetermined position when said force transmitting assembly is in the engaged condition, first drive means for applying force to said second force transmitting disc to move said second force transmitting disc to the second predetermined position relative to said first member upon operation of said force transmitting assembly from the engaged condition to the disengaged condition, force transmitting means for transmitting force applied to said second force transmitting disc by said first drive means to move said first force transmitting disc to the first predetermined position relative to said second member under the influence of force applied to said second force transmitting disc by said first drive means and transmitted from said second force transmitting disc to said first force transmitting disc upon operation of said force transmitting assembly to the disengaged condition, and a shaft connected with said first member, said force transmitting assembly further including an internally threaded member disposed in engagement with an externally threaded end portion of said shaft, said first drive means being connected with said internally threaded member and said second force transmitting disc, said first drive means includes an elongated member extending axially outwardly from said internally threaded member, a force transmitting member movable along said elongated member and connected with said second force transmitting disc, and spring means disposed between said force transmitting member and said internally threaded member for urging said force transmitting member toward a third predetermined position relative to said elongated member, said force transmitting member being movable along said elongated member from the third predetermined position against the influence of said spring means and under the influence of force transmitted from said second force transmitting disc to said force transmitting member upon operation of said force transmitting assembly from the disengaged condition to the engaged condition, said spring means being operable to move said force transmitting member along said elongated member toward the third predetermined position upon operation of said force transmitting assembly from the engaged condition to the disengaged condition, said force transmitting member being operable to transmit force to move said second force transmitting disc toward the second predetermined position upon operation of said force transmitting assembly from the engaged condition to the disengaged condition.

2. A force transmitting assembly as set forth in claim 1 wherein said reaction disc is in a fourth predetermined position relative to said second member when said force transmitting assembly is in the disengaged condition, said reaction disc being offset from said fourth predetermined position when said force transmitting assembly is in the engaged condition, said force transmitting assembly further including second drive means for moving said reaction disc to the fourth predetermined position relative to said second member upon operation of said force transmitting assembly from the engaged condition to the disengaged condition.

3. A force transmitting assembly operable between an engaged condition in which said force transmitting assembly is effective to transmit force and a disengaged condition in which said force transmitting assembly is ineffective to transmit force, said force transmitting assembly comprising a first member which is telescopically received on a shaft, a first force transmitting disc connected with and movable relative to said first member, a second force transmitting disc connected with and movable relative to said first member, a second member, a reaction disc connected with said second member and disposed between said first and second force transmitting discs, said first and second force transmitting discs having side surfaces which are disposed in engagement with opposite side surfaces of said reaction disc to transmit force between said first and second members when said force transmitting assembly is in the engaged condition, and drive means connected with said shaft and said first and second force transmitting discs for moving said first and second force transmitting discs to predetermined positions relative to said first member upon operation of said force transmitting assembly from the engaged condition to the disengaged condition, said drive means including a spring which is disposed along a central axis of said shaft and is resiliently compressible from a first condition to a second condition upon operation of said force transmitting assembly from the disengaged condition to the engaged condition, said spring being resiliently expandable from the second condition to the first condition to effect movement of said first and second force transmitting discs to their predetermined positions relative to said first member upon operation of said force transmitting assembly from the engaged condition to the disengaged condition.

4. A force transmitting assembly as set forth in claim 3 wherein said drive means includes spacer means for maintaining said first and second force transmitting discs spaced apart by a distance which is greater than the distance between opposite side surfaces of said reaction disc when said force transmitting assembly is in the disengaged condition, said spacer means being movable relative to said first member by said drive means during operation of said force transmitting assembly between the engaged and disengaged conditions.

5. A force transmitting assembly as set forth in claim 3 further including an internally threaded member which is connected with an externally threaded outer end portion of the shaft, said drive means including means for connecting said spring with said internally threaded member.

* * * * *

UNITED STATES PATENT AND TRADEMARK OFFICE
CERTIFICATE OF CORRECTION

PATENT NO. : 5,383,544
DATED : January 24, 1995
INVENTOR(S) : Kirit R. Patel

It is certified that error appears in the above-indentified patent and that said Letters Patent is hereby corrected as shown below:

Column 10, line 63, change "site site" to --side--.

Column 11, line 55, after "claim" insert --1--.

Signed and Sealed this

Eleventh Day of April, 1995

Attest:

BRUCE LEHMAN

Attesting Officer     Commissioner of Patents and Trademarks